United States Patent
Ohmori et al.

(10) Patent No.: US 8,760,884 B2
(45) Date of Patent: Jun. 24, 2014

(54) PORTABLE INFORMATION APPARATUS

(75) Inventors: Hiroyuki Ohmori, Kanagawa (JP);
Masanori Hosomi, Tokyo (JP);
Kazuhiro Bessho, Kanagawa (JP);
Yutaka Higo, Kanagawa (JP); Kazutaka Yamane, Kanagawa (JP); Hiroyuki Uchida, Kanagawa (JP)

(73) Assignee: Sony Corporation, Tokyo (JP)

( * ) Notice: Subject to any disclaimer, the term of this patent is extended or adjusted under 35 U.S.C. 154(b) by 487 days.

(21) Appl. No.: 13/149,089

(22) Filed: May 31, 2011

(65) Prior Publication Data
US 2011/0317464 A1    Dec. 29, 2011

(30) Foreign Application Priority Data

Jun. 24, 2010    (JP) .................... 2010-143410

(51) Int. Cl.
*H05K 7/14* (2006.01)
*H05K 7/18* (2006.01)

(52) U.S. Cl.
USPC ..................... 361/799; 361/816; 365/158

(58) Field of Classification Search
CPC ............ H05K 1/0207; H05K 2201/09518; H05K 3/429; H05K 5/00; H05K 7/00
USPC ............. 361/799, 816, 818, 683, 728–730; 455/73, 550.1, 556.1, 347, 348; 340/31, 111.4, 551; 360/55, 59, 360/131–133, 240, 260; 365/51, 53, 66, 74, 365/76, 97, 130, 158, 171, 173
See application file for complete search history.

(56) References Cited

U.S. PATENT DOCUMENTS

| | | | |
|---|---|---|---|
| 6,949,779 B2 * | 9/2005 | Kai et al. ................... | 257/295 |
| 7,394,683 B2 * | 7/2008 | Kumar et al. ............. | 365/158 |
| 7,652,913 B2 * | 1/2010 | Sugiyama et al. ......... | 365/158 |
| 7,878,852 B2 * | 2/2011 | Hiew et al. ............. | 439/607.01 |
| 7,952,349 B2 * | 5/2011 | Huang et al. ............. | 324/249 |
| 8,023,261 B2 * | 9/2011 | Sanford et al. ......... | 361/679.55 |

OTHER PUBLICATIONS

Internet <URL: http://ecok.co.jp/service/typeR.ppt#256.1>; Mobile Phone Data Erasure System ecoK erase type R; Mar. 4, 2011.

* cited by examiner

*Primary Examiner* — Hung S Bui
(74) *Attorney, Agent, or Firm* — Dentons US LLP

(57) ABSTRACT

The present disclosure provides a portable information apparatus, including, an apparatus main body, an incidental article mounted on the apparatus main body when the portable information apparatus is used, a solid-state magnetic memory provided at a portion of the apparatus main body at which the incidental article is mounted and adapted to retain information in accordance with a magnetization state of a magnetic material, and a magnetic shield provided on the incidental article including a portion opposed to the solid-state magnetic memory when the incidental article is mounted on the apparatus main body.

3 Claims, 4 Drawing Sheets

PORTABLE INFORMATION APPARATUS

BACKGROUND

The present disclosure relates to a portable information apparatus such as a portable telephone set or a notebook type personal computer. More particularly, the present disclosure relates to a portable information apparatus which can record information into an internal memory and wherein a storage device which retains information by a magnetization state of a magnetic substance.

Portable information apparatus such as a portable telephone set and a notebook type personal computer have spread widely and retain much significant information such as confidential information or personal information.

In the case where such portable information apparatus are to be discarded, sold as used apparatus or lent as a rental apparatus, it is necessary to erase confidential information or personal information.

As a method of erasing information, such a method as to execute a program for information erasure to fully overwrite information is used (refer to, for example, in "Guide to Portable Telephone Data Erasure Software", [online], ecoK Co., Ltd., Searched Jun. 24, 2010, Internet <URL: http://ecok-.co.jp/service/typeR.ppt#256.1>.

SUMMARY

However, since the recording capacity of portable information apparatus has increased in recent years, with the method of overwriting information using a program, a long period of time is taken for erasure of information.

Further, although a solid state drive (SSD) which uses a flash memory in place of a hard disk has been put into use in recent years, the solid state drive does not allow direct accessing to a recording memory. Therefore, it cannot be confirmed whether or not information is erased fully.

Further, with the solid state drive, in the case where the portable information apparatus cannot be energized or started up because of failure or the like, erasure of information is very difficult.

Therefore, it is desirable to provide a portable information apparatus which can erase information rapidly and with certainty.

According to the present disclosure, there is provided a portable information apparatus including an apparatus main body, an incidental article mounted on the apparatus main body when the portable information apparatus is used, a solid-state magnetic memory provided at a portion of the apparatus main body at which the incidental article is mounted and adapted to retain information in accordance with a magnetization state of a magnetic material, and a magnetic shield provided on the incidental article including a portion opposed to the solid-state magnetic memory when the incidental article is mounted on the apparatus main body.

In the portable information apparatus, the solid-state magnetic memory provided at the portion of the apparatus main body at which the incidental article is mounted, and the magnetic shield is provided on the incidental article including the portion opposed to the solid-state magnetic memory when the incidental article is mounted on the apparatus main body.

Consequently, if the incidental article is mounted on the apparatus main body in order to use the portable information apparatus, then the magnetic shield is positioned in an opposing relationship to the solid-state magnetic memory of the apparatus main body. Consequently, the solid-state magnetic memory is protected by the magnetic shield so that information recorded in the solid-state magnetic memory may not be erased by an external magnetic field.

On the other hand, if the incidental article is taken out from the apparatus main body, then since the solid-state magnetic memory is no more protected by the magnetic shield, it is possible to apply a magnetic field to erase information of the solid-state magnetic memory readily and in short time.

With the portable information apparatus, since information of the solid-state magnetic memory can be erased readily in short time, erasure of confidential information, personal information or like information can be carried out rapidly and with certainty.

Further, since it is possible to apply a magnetic field to carry out erasure of information readily without energization, even when the portable information apparatus cannot be energized or started up, information can be erased.

Accordingly, with the portable information apparatus, the labor for erasure of confidential information or personal information upon discarding or re-utilization of the portable information apparatus can be reduced.

DETAILED DESCRIPTION OF THE PREFERRED EMBODIMENTS

Figure 1A:
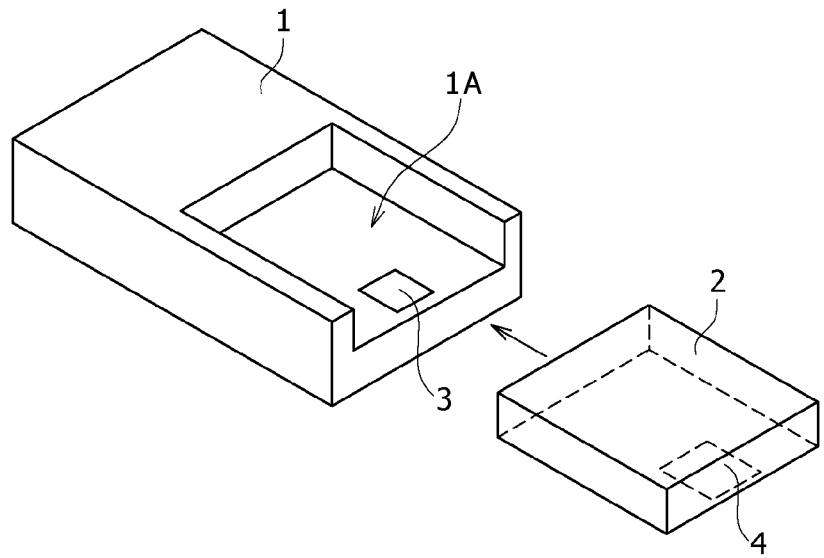
FIGS. 1A, 1B and 1C are schematic views showing a general configuration of a personal digital assistant according to a first embodiment of the present disclosure.

In the following, embodiments of the present disclosure are described with reference to the drawings.

It is to be noted that the description is given in the following order:
1. Outlines of the Disclosure
2. First Embodiment
3. Second Embodiment

1. Outline of the Disclosure

Investigations have been conducted in order to achieve provision of a portable information apparatus which can erase information rapidly and with certainty. Through the investigations, it has been found that, if a solid-state magnetic memory such as an MRAM (Magnetoresistive Random Access Memory) is used to record information and then the recorded substance of the solid-state magnetic memory is erased by an external magnetic field, then the information can be erased rapidly and with certainty.

In the present disclosure, a solid-state magnetic memory such as an MRAM is used as a memory for storing information such as confidential information or personal information in a personal digital assistant.

The solid-state magnetic memory may be used solely.

If the solid-state magnetic memory itself does not have a sufficient capacity, then such significant information may be encrypted and recoded into a large-capacity memory such as a flash memory while only an encryption key therefor is recorded in the solid-state magnetic memory.

An MRAM marketed at present includes a magnetic shield built in a memory package thereof in order to assure a sufficient resisting property against an external magnetic field.

However, if an MRAM which includes no magnetic shield or includes a magnetic shield of a reduced effect is used, then it is possible to erase information in the magnetic memory readily using an external magnetic field which can be generated by a simple and easy method.

However, the magnetic memory in a state in which the effect of the magnetic shield is low is vulnerable in ordinary use, and therefore, it is much preferable to apply a magnetic shield to the magnetic memory by some method.

Therefore, it is considered good to apply a magnetic shield to an incidental article such as a battery or a SIM card (Subscriber Identity Module Card) for subscriber identification of a portable telephone set, which is not removed in ordinary use.

Or, such a mechanism as moves, upon mounting of such an incidental article as mentioned above, a magnetic shield portion to a position over the magnetic memory so as to exhibit a shielding effect may be provided.

As a material of the magnetic shield, a NiFe alloy or a CoFe alloy or else an amorphous alloy or the like which have a soft magnetism and a high saturation magnetic flux density is suitably used.

The magnetic shield may be provided separately from an incidental article such as a battery, or a container for an incidental article such as a battery may be configure from a soft magnetic substance so as to act as a magnetic shield.

However, it is difficult to apply a magnetic shield to a small article such as a SIM card.

Further, a SIM card preferably has compatibility among various apparatus.

Accordingly, it is suitable to configure a holder, which is used upon mounting of a SIM card, from a soft magnetic material so as to act as a magnetic shield rather than to apply a magnetic shield directly to a SIM card.

From the foregoing, in the present disclosure, a portable information apparatus which includes an apparatus main body and an incidental article mounted on the apparatus main body when the portable information apparatus is used is configured such that a solid-state magnetic memory for retaining information by a magnetization state of a magnetic substance is provided at a portion of the apparatus main body at which the incidental article is to be mounted.

Further, a magnetic shield is provided including a portion of the incidental article which opposes to the solid-state magnetic memory when the incidental article is mounted on the apparatus main body. The magnetic shield may be formed only at the portion of the incidental article which opposes to the solid-state magnetic memory or may be formed over the portion opposing to the solid-state magnetic memory and another portion of the incidental article or else may be formed over the overall incidental article.

For example, the incidental article may be a battery for supplying power to the apparatus main body, and the magnetic shield may be provided on a member of the battery.

Or, the incidental article may be a card and a card holder for retaining the card, which are mounted on the apparatus main body, and the card holder may be formed from a soft magnetic substance to configure the magnetic shield. The card may be a SIM card described hereinabove or the like.

Erasure of information of the portable information apparatus can be carried out by such a method as described below.

First, an incidental article which includes a magnetic shield, for example, a battery, is removed from the portable information apparatus.

Then, an apparatus which generates a magnetic field of a sufficient intensity to erase the information of a solid-state magnetic memory is used to expose the solid-state magnetic memory to the magnetic field.

By the processing, the information recorded in the solid-state magnetic memory is erased.

As the magnetic field for erasure of information, a magnetic field is suitable which can be concentrated by a magnetic yoke so that an extra magnetic field may not be applied to any other element than the solid-state magnetic memory.

The source of generation of the magnetic field may be a permanent magnet or an electromagnet.

In the portable information apparatus of the present disclosure, when the apparatus is used, the incidental article is mounted on the apparatus main body. Therefore, a magnetic shield is disposed in an opposing relationship to the solid-state magnetic memory of the apparatus body, and consequently, information recorded in the solid-state magnetic memory can be protected by the magnetic shield.

On the other hand, when the information is to be erased, if the incidental article is removed from the apparatus main body, then the solid-state magnetic memory is not protected by the magnetic shield any more. Consequently, a magnetic field can be applied to erase information of the solid-state magnetic memory readily and in short time.

Since information of the solid-state magnetic memory can be erased readily and in short time, erasure of confidential information, personal information and so forth can be carried out rapidly and with certainty.

Further, erasure of information can be carried out readily by application of a magnetic field without energization, and consequently, even when the portable information apparatus cannot be energized or started up, information can be erased.

Accordingly, with the portable information apparatus of the present disclosure, the labor for erasure of confidential information or personal information upon discarding or re-utilization of the portable information apparatus can be reduced.

2. First Embodiment

Now, particular preferred embodiments of the present disclosure are described.

First, a first embodiment is described with reference to FIGS. 1A to 1C which show a general configuration of a personal digital assistant as a portable information apparatus.

Figure 1B:
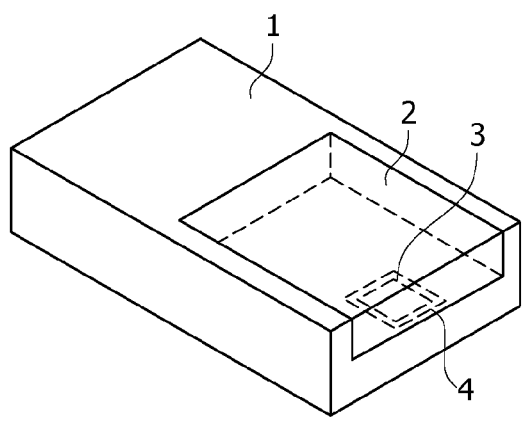
Figure 1C:
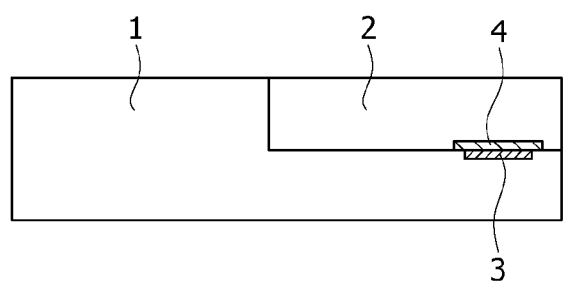

FIG. 1A is a perspective view of the personal digital assistant in a state in which a personal digital assistant main body and a battery are separated from each other while FIG. 1B is a perspective view of the personal digital assistant in another state in which the battery is mounted on the personal digital assistant main body. Further, FIG. 1C is a sectional view of the personal digital assistant in the state of FIG. 1B.

Referring first to FIG. 1A, the personal digital assistant main body 1 has a recessed portion 1A which serves as a space for mounting a battery 2 therein.

A solid-state magnetic memory 3 is formed in an embedded state on a bottom face of the recessed portion 1A.

Meanwhile, a magnetic shield 4 is formed on a bottom face of the battery 2.

In particular, the magnetic shield 4 is formed on the bottom face of the battery 2 such that it fully covers the solid-state magnetic memory 3 when the battery 2 is mounted on the personal digital assistant main body 1.

Consequently, if the battery 2 is mounted on the personal digital assistant main body 1 as seen in FIG. 1B from a state illustrated in FIG. 1A in which the battery 2 is separated from the personal digital assistant main body 1, then the magnetic shield 4 covers the solid-state magnetic memory 3 in a neighboring relationship with the latter. Therefore, an external magnetic field which may possibly be applied can be reduced.

In the personal digital assistant of the present embodiment, erasure of information is carried out, for example, in such a manner as described below.

First, a form of an erasing method of information is described with reference to FIGS. 2A to 2C.

Figure 2A:
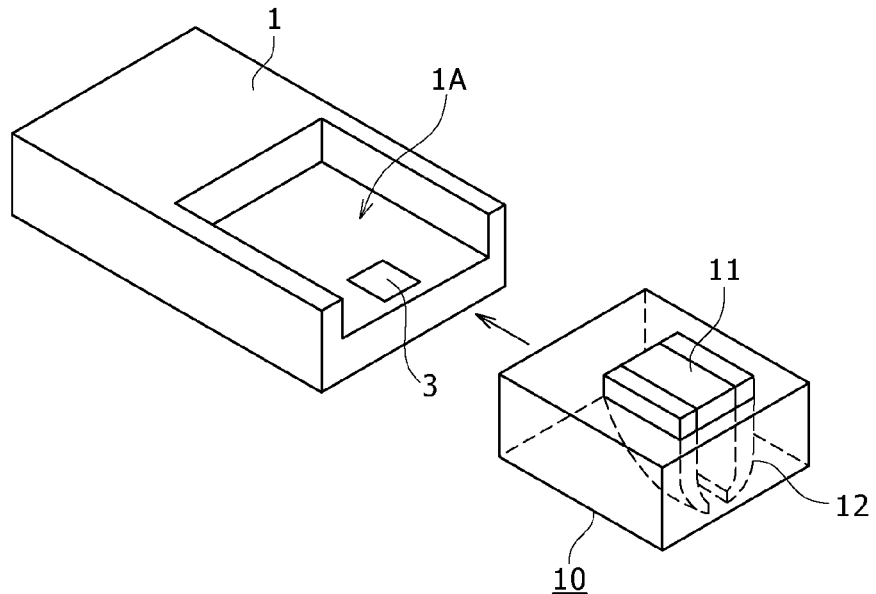
FIGS. 2A, 2B and 2C are schematic views illustrating a form of an erasing method of information by the personal digital assistant of FIGS. 1A to 1C.

FIG. 2A is a perspective view showing the personal digital assistant main body 1 of the personal digital assistant with the battery removed and an information erasing apparatus 10 placed in a juxtaposed relationship with each other.

Referring first to FIG. 2A, the information erasing apparatus 10 includes a permanent magnet 11 attached to a member having a shape of a parallelepiped, and a magnetic yoke 12 formed in the parallelepiped-shaped member. The magnetic yoke 12 collects magnetic fluxes from the information erasing apparatus 10 which pass from end portions of the permanent magnet 11 on this side and the remote side of FIG. 2A through the inside of the parallelepiped-shaped member toward the bottom of the parallelepiped-shaped member.

The parallelepiped-shaped member of the information erasing apparatus 10 is dimensioned such that it can be mounted in the recessed portion 1A of the personal digital assistant main body 1 in which the battery 2 is to be mounted.

Figure 2B:
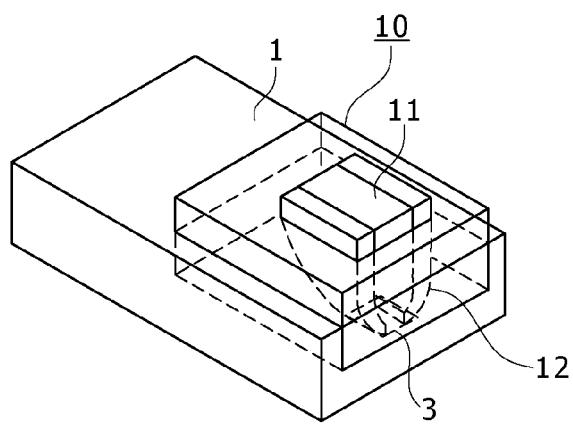
Figure 2C:
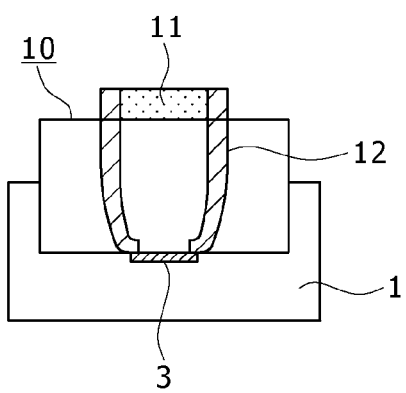

The information erasing apparatus 10 in a state in which it is mounted on the personal digital assistant main body 1 is shown in a perspective view of FIG. 2B, and the information erasing apparatus 10 in the state shown in FIG. 2B is shown in a sectional view of FIG. 2C including the solid-state magnetic memory 3.

In the state in which the information erasing apparatus 10 is mounted on the personal digital assistant main body 1, the magnetic yoke 12 extends to the proximity of an end portion of the solid-state magnetic memory 3 of the personal digital assistant main body 1. Consequently, it is possible to apply a magnetic field generated from the magnetic yoke 12 efficiently to the solid-state magnetic memory 3 to erase information of the solid-state magnetic memory 3.

Figure 3:
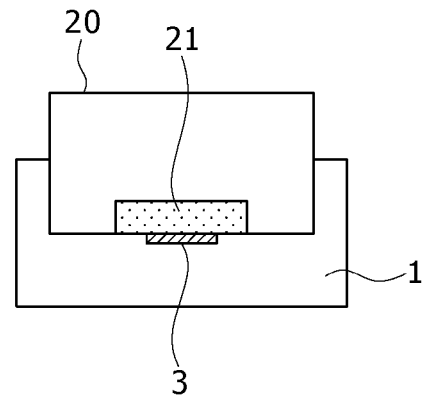
FIG. 3 is a schematic view illustrating another form of the erasing method information by the personal digital assistant of FIGS. 1A to 1C.

Another form of an information erasing method is illustrated in FIG. 3. FIG. 3 particularly shows a sectional view of the personal digital assistant main body 1 on which an information erasing apparatus 20 of another configuration is mounted.

In the information erasing apparatus 20 shown in FIG. 3, a permanent magnet 21 is provided on the bottom face of a member on which the personal digital assistant main body 1 is to be mounted.

Consequently, when the information erasing apparatus 20 is mounted on the personal digital assistant main body 1, the permanent magnet 21 is positioned in the proximity of the solid-state magnetic memory 3. Consequently, it is possible to apply a magnetic field from the permanent magnet 21 efficiently to the solid-state magnetic memory 3 to erase information of the solid-state magnetic memory 3.

According to the configuration of the personal digital assistant of the embodiment described above, the solid-state magnetic memory 3 is provided at the location of the personal digital assistant main body 1 on which the battery 2 is to be mounted and the magnetic shield 4 is provided at the location of the personal digital assistant main body 1 opposing to the solid-state magnetic memory 3 when the battery 2 is mounted.

Consequently, when the personal digital assistant is used, since the battery 2 is mounted on the personal digital assistant main body 1, the magnetic shield 4 is positioned in an opposing relationship to the solid-state magnetic memory 3. Consequently, information recorded in the solid-state magnetic memory 3 can be protected by the magnetic shield 4.

Further, if the battery 2 is removed from the personal digital assistant main body 1, then since the solid-state magnetic memory 3 is no more protected by the magnetic shield 4, it is possible to use the information erasing apparatus 10, information erasing apparatus 20 or the like to apply a magnetic field to erase information of the solid-state magnetic memory 3 readily in a short period of time.

In short, with the personal digital assistant of the present embodiment, it is possible to carry out erasure of confidential information, personal information or the like rapidly and with certainty.

Further, since it is possible to apply a magnetic field to carry out erasure of information readily, even when the personal digital assistant cannot be energized or started, information can be erased.

Accordingly, the labor for erasure of confidential information or personal information when the personal digital assistant is to be discarded or re-used.

3. Second Embodiment

A personal digital assistant according to a second embodiment of the present disclosure is described below with reference to FIGS. 4A to 5B.

The personal digital assistant of the present embodiment is configured such that a holder for a SIM card is provided with a magnetic shield function.

Figure 4A:
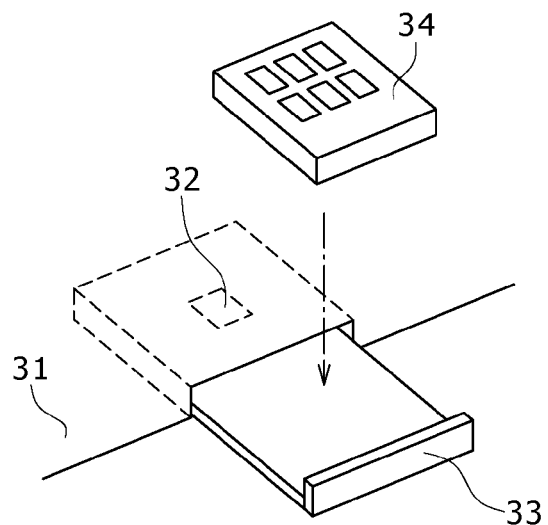
FIGS. 4A, 4B, 5A and 5B are schematic views showing a general configuration of a personal digital assistant according to a second embodiment of the present disclosure.

First, FIG. 4A is a perspective view of the personal digital assistant 31 in a state in which a SIM card 34 is take out from a card holder 33 made of a soft magnetic substance.

A personal digital assistant main body 31 has a space formed therein for receiving the card holder 33 and the SIM card 34 inserted therein. A solid-state magnetic memory 32 is formed on a bottom face of the space.

In the state illustrated in FIG. 4A, since the solid-state magnetic memory 32 and the card holder 33 which has a shield function are spaced from each other, the magnetic shield effect of the card holder 33 is little had on the solid-state magnetic memory 32. Therefore, information of the solid-state magnetic memory 32 can be erased readily by an external magnetic field.

Figure 4B:
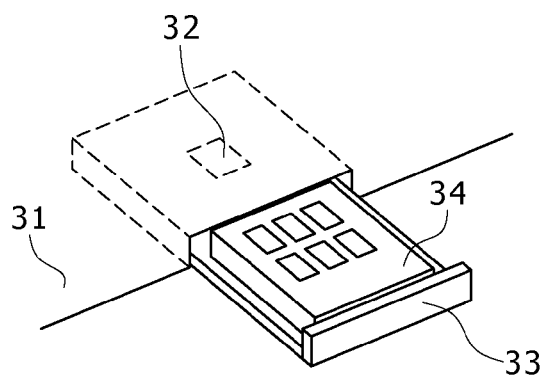

FIG. 4B is a perspective view of the personal digital assistant main body 31 in another state in which the SIM card 34 is placed on the card holder 33.

If the card holder 33 is inserted into the space of the personal digital assistant main body 31 from the state in which the SIM card 34 is placed on the card holder 33 in this manner, then the SIM card 34 can be loaded into the personal digital assistant main body 31.

Figure 5A:
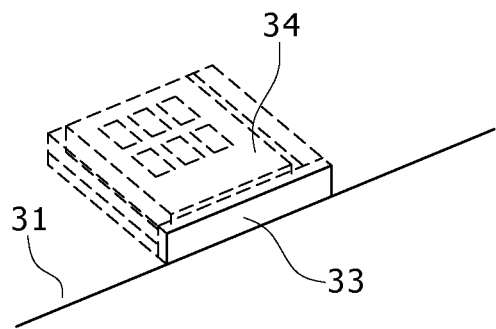

FIG. 5A is a perspective view of the personal digital assistant main body 31 in a further state in which the card holder 33 is inserted in the personal digital assistant main body 31 and the SIM card 34 can be used. Meanwhile, FIG. 5B is a sectional view of a portion of the solid-state magnetic memory 32 in the state of FIG. 5A.

Figure 5B:
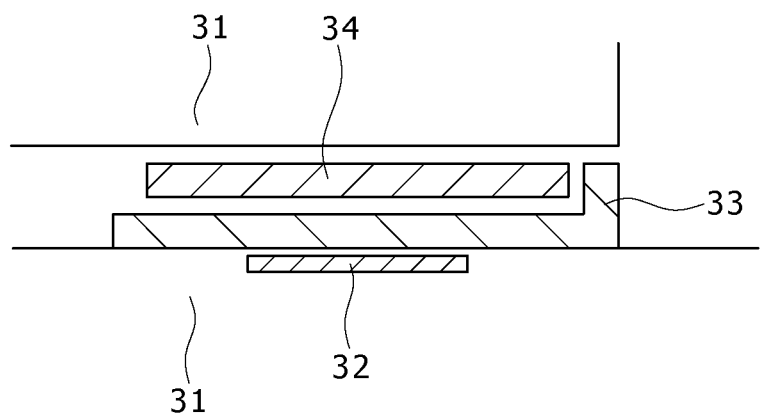

Referring to FIGS. 5A and 5B, the card holder 33 and SIM card 34 are inserted in the space of the personal digital assistant main body 31, and the SIM card 34 can be used.

Further, the card holder 33 made of a soft magnetic substance is disposed in the proximity above the solid-state magnetic memory 32. Consequently, information of the solid-state magnetic memory 32 can be protected against erasure by a magnetic shield effect of the card holder 33.

According to the configuration of the personal digital assistant of the embodiment described above, the solid-state magnetic memory 32 is provided at the location of the personal digital assistant main body 31 at which the card holder 33 and the SIM card 34 are to be mounted.

Further, the SIM card 34 is made of a soft magnetic substance and configures a magnetic shield, and when the card holder 33 and the SIM card 34 are mounted, the SIM card 34 opposes to the solid-state magnetic memory 32.

Consequently, since, when the personal digital assistant is used, the card holder 33 and the SIM card 34 are mounted on the personal digital assistant main body 31, the SIM card 34 serving as a magnetic shield is disposed in an opposing relationship to the solid-state magnetic memory 32. Consequently, information recorded in the solid-state magnetic memory 32 can be protected.

On the other hand, if the card holder 33 and the SIM card 34 are taken out from the personal digital assistant main body 31, then the card holder 33 is brought out of protection by the magnetic shield of the SIM card 34. Therefore, it is possible to apply a magnetic field to erase information of the solid-state magnetic memory 32 readily in a short period of time.

In particular, with the personal digital assistant of the present embodiment, erasure of confidential information, personal information or the like can be carried out rapidly and with certainty.

Further, since it is possible to apply a magnetic field to carry out erasure of information readily without energization, even when energization or starting up cannot be carried out, information can be erased.

Accordingly, the labor for erasure of confidential information or personal information upon discarding or re-utilization of the personal digital assistant can be reduced.

While preferred embodiments of the present disclosure have been described using specific terms, such description is for illustrative purpose only, and it is to be understood that changes and variations may be made without departing from the spirit or scope of the following claims.

The present disclosure contains subject matter related to that disclosed in Japanese Priority Patent Application JP 2010-143410 filed in the Japan Patent Office on Jun. 24, 2010, the entire content of which is hereby incorporated by reference.

What is claimed is:

1. A portable information apparatus, comprising:
an apparatus main body;
an incidental article mounted on said apparatus main body when said portable information apparatus is used;
a solid-state magnetic memory provided at a portion of said apparatus main body at which said incidental article is mounted and adapted to retain information in accordance with a magnetization state of a magnetic material; and
a magnetic shield provided on said incidental article including a portion opposed to said solid-state magnetic memory when said incidental article is mounted on said apparatus main body.

2. The portable information apparatus according to claim 1, wherein said incidental article is a battery for supplying power to said apparatus main body and said magnetic shield is provided on a member of said battery.

3. The portable information apparatus according to claim 1, wherein said incidental article includes a card and a card holder for retaining said card, and said card holder is made of a soft magnetic substance and configures said magnetic shield.

* * * * *